United States Patent [19]

Schumacher et al.

[11] Patent Number: 5,841,854
[45] Date of Patent: *Nov. 24, 1998

[54] WIRELESS TELEPHONE INTEGRATION SYSTEM AND METHOD FOR CALL CENTERS AND WORKGROUPS

[75] Inventors: Gregory D. Schumacher, Holliston; Robert F. Penfield, Maynard; Patrick J. MeLampy, Pepperell, all of Mass.

[73] Assignee: Priority Call Management, Inc., Wilmington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 905,589

[22] Filed: Aug. 4, 1997

Related U.S. Application Data

[63] Continuation of Ser. No. 473,674, Jun. 7, 1995, abandoned, which is a continuation-in-part of Ser. No. 198,032, Feb. 16, 1994, abandoned.

[51] Int. Cl.⁶ ................................................. H04M 3/00
[52] U.S. Cl. ..................... 379/265; 379/207; 379/211; 379/220; 379/224; 455/403; 455/554
[58] Field of Search ............................... 379/201, 207, 379/219, 220, 229, 67, 224, 230, 245, 246, 127, 142, 58, 59, 60, 88, 213, 265, 211, 154, 82, 212, 266, 309, 270, 271; 455/403, 554, 555; 370/270, 271

[56] References Cited

U.S. PATENT DOCUMENTS

| | | | |
|---|---|---|---|
| 4,685,127 | 8/1987 | Miller et al. | 379/221 |
| 4,757,526 | 7/1988 | Foster et al. | 379/201 |
| 4,783,796 | 11/1988 | Ladd | 379/67 |
| 4,887,265 | 12/1989 | Felix | 379/59 |
| 4,926,462 | 5/1990 | Ladd et al. | 379/67 |
| 4,935,956 | 6/1990 | Hellwarth et al. | 379/112 |
| 4,972,464 | 11/1990 | Webb et al. | 379/112 |
| 5,006,983 | 4/1991 | Wayne et al. | 379/266 |
| 5,008,930 | 4/1991 | Gawrys et al. | 379/210 |
| 5,073,890 | 12/1991 | Danielsen | 370/270 |
| 5,090,050 | 2/1992 | Heffernan | 379/60 |
| 5,113,430 | 5/1992 | Richardson, Jr. et al. | 379/88 |
| 5,199,062 | 3/1993 | Von Meister et al. | 379/67 |
| 5,206,903 | 4/1993 | Kohler et al. | 379/309 |
| 5,235,630 | 8/1993 | Moody et al. | 379/37 |
| 5,299,260 | 3/1994 | Shaio | 379/265 |
| 5,327,486 | 7/1994 | Wolff et al. | 379/142 |
| 5,329,578 | 7/1994 | Brennan et al. | 379/89 |
| 5,335,266 | 8/1994 | Richardson, Jr. et al. | 379/67 |
| 5,335,268 | 8/1994 | Kelly, Jr. et al. | 379/112 |
| 5,335,269 | 8/1994 | Steinlicht | 379/266 |
| 5,353,331 | 10/1994 | Emery et al. | 379/67 |
| 5,375,161 | 12/1994 | Fuller et al. | 379/212 |
| 5,392,345 | 2/1995 | Otto | 379/265 |
| 5,392,346 | 2/1995 | Hassler et al. | 379/265 |
| 5,400,327 | 3/1995 | Dezonno | 370/271 |
| 5,440,563 | 8/1995 | Isidro et al. | 379/219 |
| 5,459,780 | 10/1995 | Sand | 379/265 |
| 5,548,636 | 8/1996 | Bannister et al. | 379/201 |
| 5,566,236 | 10/1996 | MeLampy et al. | 379/201 |
| 5,590,188 | 12/1996 | Crockett | 379/225 |
| 5,619,557 | 4/1997 | Van Berkum | 379/265 |
| 5,668,862 | 9/1997 | Bannister et al. | 379/201 |

*Primary Examiner*—Scott T. Wolinsky
*Attorney, Agent, or Firm*—Crosby, Heafey, Roach & May

[57] ABSTRACT

A system and method for automatic call distribution targeting users in workgroups wherein the users utilize either wired or wireless communications tools. Users are chosen via a rule-based selection process including access to a database of user and caller-screened information. The system is compatible with available and developmental hardware platforms for call centers and mobile workers including SS7/AIN, computer telephony interfaces, direct cellular network connections, PBX and centrex-based systems.

18 Claims, 6 Drawing Sheets

WIRELESS TELEPHONE INTEGRATION SYSTEM AND METHOD FOR CALL CENTERS AND WORKGROUPS

RELATED APPLICATIONS

This application is a continuation of application Ser. No. 08/473,674 filed on Jun. 7, 1995, now abandoned, which is a continuation-in-part of application Ser. No. 08/198,032 filed Feb. 16, 1994, now abandoned.

BACKGROUND OF THE INVENTION

1. Field of the Invention

The present invention relates in general to telecommunications equipment, and more particularly relates to methods and apparatus for interfacing wireless telecommunications terminals into a call center or workgroup environment.

2. Related Art

The telecommunications industry is currently undergoing a massive shift from wired telecommunications devices to wireless devices. Impetus for this transition is provided by wireless mobility and the reduced cost of system reconfiguration. The invention described herein fits the form and function of a Personal Communications Service (PCS).

Automatic Call Distributors (ACD) are specialized phone systems used for handling many incoming calls. Once used only by airlines, rent-a-car companies, and hotel chains, ACDs are now used by numerous companies facing a heavy load of incoming calls (e.g., order taking, dispatching of service technicians, taxis, railroads, help desks, and answering technical questions).

An ACD performs four functions. First, it will recognize and answer an incoming call. Second, it will look in its database for instructions on what to do with that call. Third, based on the instructions found, it will send the caller either a recording asking the caller to continue to hold the line, or to a voice response unit (VRU). Fourth, it will send the call to an agent as soon as that agent has completed his or her previous call, and/or the caller has heard a prerecorded hold message.

The term Automatic Call Distributor arose from the device's function of distributing incoming calls in some logical pattern to a group of operators. That pattern might be Uniform (i.e., distribute the work uniformly) or it may be Top-Down (i.e., the same agents in the same order get the calls and are kept busy—the ones on the top are kept busier than the ones on the bottom). Alternatively, the pattern may include specialty routing, where the calls are routed to answerers who are most likely to be able to help the caller.

While distributing calls logically is the function most commonly associated with an ACD, it is not the ACD's only function. Larger ACDs are used in call centers—a facility where calls are answered and made. A call center will typically have several people (also called agents), an ACD, and a computer for order-entry and look up on customers' orders. A call center could also have a predictive dialer for quickly dialing calls.

Some call centers are further identified as being in-bound call centers and/or out-bound call centers. In-bound call centers only process received calls. Typical applications include catalog sales, customer service, ticket sales, etc. Out-bound call centers only process calls initiated within the out-bound center. Typical applications include telephone sales, fund-raising and general solicitation.

Agents Are Not Mobile

Because telephone sets currently used by ACD agents are wired telephones, the agents using these sets are not mobile and must be at their desks or workstations to receive and process calls. The agent is associated (registered) through a particular telephone at a particular location. With current wire-dependent ACDs, agents can register at other telephones (change registration, that is, but not register at multiple locations) however, the process is cumbersome and must be done at telephones defined as ACD telephones. The burden of changing registration is magnified by the fact that agents are usually logged into computer workstations which are neither portable nor wireless. In order to move to another telephone, agents must log out of their workstations, become unavailable or log out of the ACD system, log into another computer station on the same computer network, and log in or become available to the ACD system at their new telephones.

All of the information associated with a call being handled by an agent must be present in the work area near the telephone, either in documented form or in an on-line retrievable format. And currently, the agent is unable to "take the call" with him or her to perform research in other work areas, confer with other agents, go to a lab to reproduce the caller's problem on the agent's own lab setup, or move the call to a conference room. Moreover, agents are unable to leave their designated ACD work areas, take breaks or go to meetings without making themselves unavailable to callers.

Telephones Must Be Dedicated To ACD Functions

Because the ACD function is delivered to a particular telephone with an agent registered to that telephone, that telephone becomes dedicated to the ACD function. Similarly to be counted in network traffic measurements, particular telephones must be dedicated to the ACD function. An agent cannot register with an ACD system from a telephone in a public common area like a cafeteria, lobby or library. Moreover, while some telephones can be set up to share the ACD and business functions by having multiple extensions appear, these configurations are difficult to reconfigure.

Off-premise delivery of ACD lines to the home, remote office, or other remote location is limited by the need for dedicated special access lines between the ACD device and the remote telephone. The remote telephone is then dedicated to the ACD function unless it can handle multiple telephone lines, as described above. Moreover, any ACD telephone line connected to the multi-line remote telephone will only perform the ACD function. Thus, for the off-premise remote terminal, an additional line or port is required if any data is needed for the ACD based call.

Mobile Workforce Not Supported Efficiently

There are several employment types which qualify as mobile. Among these are, for example, sales people traveling to customer sites, telecommuting workers working at home or at a satellite resource center, and workers who must perform a portion of their job outside normal working hours. Currently, reaching mobile workers entails alerting or contacting the worker through a personal communication device such as a cellular telephone, radio pager, or specialized mobile radio device. Currently, a caller cannot dial a generic sales department number and reach the first available salesman, whether that salesman is in the office or on the road. Because of this limitation, ACD users often resort to setting up "inside sales" departments which handle the initial sales inquiries and then route messages to the appropriate individuals.

Currently, to receive business calls while away from the office, telecommuting workers must "forward" their personal extensions through the particular business' telephone system (PBX or centrex) to some pre-defined dialed number which represents the worker's remote home phone, resource center temporary office phone, cellular telephone, or pager. However, the ACD function cannot be forwarded in a similar fashion to a remote telephone.

One available solution is for the mobile worker to periodically check a voice mail system's mailbox and return calls. The efficacy of this solution is limited by the frequency of the worker's mailbox checks.

Workgroups Not Supported Efficiently

A trend in many organizations is to move away from a hierarchical organizational structure to a flattened structure made up of many dynamic work groups. These work groups are cross-organizational, containing members from many different functional or product units. Workgroups can exist for short or long time periods, depending upon their function. Membership in a workgroup can also change over time as the nature of the task changes from, for instance, product design to manufacturing. Individuals in an organization may be members of more than one workgroup at any particular time.

Presently, only portions of workgroup needs are supported by available products. For instance, group messaging in voice messaging systems supports distributing messages to all members of a group. However, an ideal group messaging capability would be consistently available to all workgroup members rather than only to individual workgroup members who have access to their voice messaging system and personal group distribution lists.

Computer software products supporting workgroup behavior, such as Lotus NOTES (TM), support data and information communication needs of the workgroup. However, there is a particular class of workgroup behaviors, outlined below, which are not served by these tools or by the systems described above. Existing ACDs can partially support these behaviors by distributing workgroup calls to members of the workgroups. However, the requirements of particular telephone configurations and the difficulty of configuring ACDs into groups does not promote the rapid and dynamic nature of workgroup creation, restructure and dissolution.

A first unique need of the workgroup is providing the caller the ability to contact any group member without specifying the particular group member reached. This need exists for both intra-group communication and outside access.

In contrast, some spoken communication with a group requires reaching a particular member possessing some specialized skill or knowledge. For example, a financial questions may call for an accounting-based workgroup member. Other spoken communication with the group may be urgent, such as a status report request, but subject to proper handling by any (i.e., the first available) group member since all members are to be up to date in their knowledge of the group's focus. If the member of the group contacted can't support the call, he or she needs to be able to pass the call off to the most appropriate group member.

Likewise, for spoken communication within a group, there will be some communication which has to target a particular member of the group and other calls for which any workgroup member will suffice. Either the member reached can resolve the issue or any number of workgroup members could decide that more members of the workgroup need to get involved. In the latter event, the members could either select a conference call capability where the workgroup members are automatically contacted or alerted and asked to join the workgroup conference call, or a face-to-face meeting could be scheduled with workgroup members, or the issue could be moved to an electronic data and information forum using computer tools such as Lotus NOTES (TM).

Limitations With Current Wireless Solutions

As discussed above, because ACD telephones must be dedicated to the ACD function, mobile workers cannot easily move from phone to phone while performing call center functions. Cellular telephone systems do not cure this flaw because they do not offer the workgroup approach provided by ACD devices which associate particular sets of people with particular telephone numbers. Cellular telephone systems treat all subscribers as individuals with no special functional relationship between them. Moreover, cellular telephone systems do not provide integration with an enterprise's own PBX or communication system to provide a wireless function to the enterprise's ACD device. Similarly, wireless PBXs currently do not have the radio range required for a truly mobile ACD function.

Radio paging systems do provide some support to workgroups. However, radio paging systems only provide the alerting function for a telephony voice communication. These one-way paging systems do not support two-way conversations. Radio paging systems can alert a group of people that a call arrived, but cannot control who answers the call, and cannot determine in real time who is available and not available to answer the call.

Specialized mobile radio (SMR) systems provide some primitive group communication and alerting. However, SMRs fail to provide full ACD functionality. Using SMR, a voice call can reach a particular group of people, but the group cannot be easily reconfigured and the availability of individuals in the group cannot be used to selectively control the alerting and transmission functions.

The invention disclosed herein will support any radio communication and transmission media or method (either one-way, two-way or multi-way communication) in an integrated fashion, taking advantage of the best features of each while concealing their respective limitations from the user.

Figure 1:
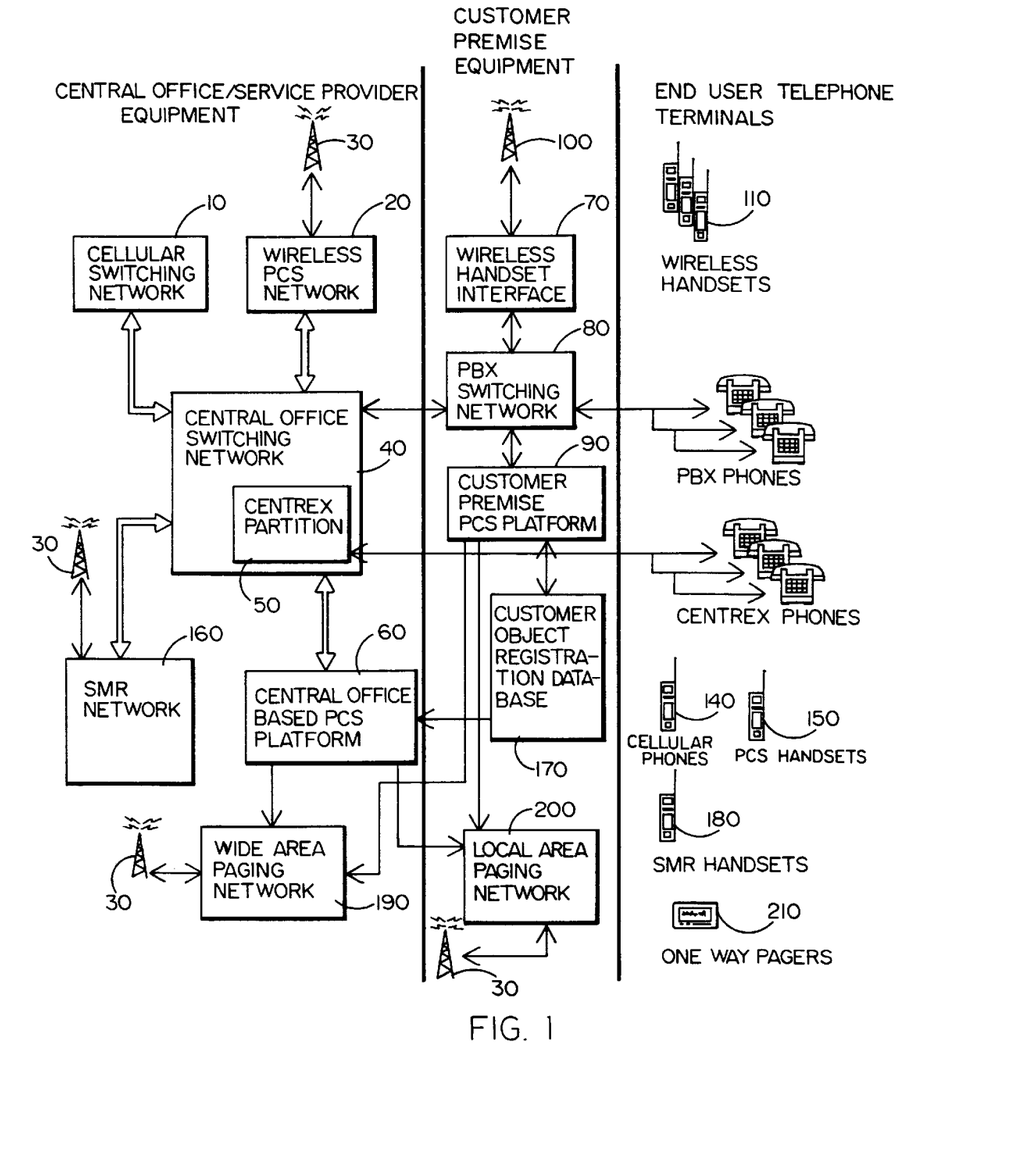
FIG. 1 provides a functional block diagram of the environment in which the method and system of the invention can be implemented.

Existing ACD systems distribute calls only to telephones 120 or to off premise telephones such as a home telephone or remote regional office. Referring to FIG. 1, calls which arrive at PBX 80 or centrex partition 50 are routed to the correct directly connected terminal. The coverage plan for the call is programmable, and the call may forward to additional telephone terminals 120, voicemail, or a receptionist.

Existing ACD systems provide for specialized call distribution capability beyond the individual extension call distribution capability typically found on PBX Switching Network 80 or centrex partition 50. For example, a caller to an existing ACD system can specify an extension number just as he or she would if calling a PBX Switching Network 80, or a centrex partition 50.

In an existing ACD system, the extension number is associated with a group or pool of telephones as opposed to an individual line, circuit or telephone of PBX 80 or centrex 50. The telephones in an existing ACD telephone pool all share the same extension but do not share (i.e., simultaneously communicate with) calls to the ACD extension. Calls which arrive at an existing ACD are routed to telephones within selected groups or pools according to simple criteria such as the telephone which has been idle longest. Existing ACD systems keep track of the status of the telephones within a group or a pool to determine if a particular ACD telephone is available to take a call. Existing ACD systems allow rules to be used to influence call distribution. One rule might be the language capabilities of the agent assigned to each telephone and compatibility with the caller's preferred language.

Existing ACD systems provide status reports and real time monitors to provide management and maintenance of call handling, call duration and call resource capabilities, and provide supervisor monitoring capability. Monitoring allows a group supervisor to listen in on conversations to check for correct implementation of procedures. Existing ACD systems provide for links via data communication channels to customers' Management Information Systems to select caller related data and to assist in delivering calls to agents.

However, all existing ACD systems known to the inventor fail to provide call distribution to agents, in a manner independent of their "assigned" telephone, whether wired or wireless, flexible or dedicated, data-integrated or voice-dedicated. There is therefore a need in the art for an improved ACD system capable of integrating all available hardware types into a workgroup environment wherein the workgroup members, not assigned telephones or computer terminals, are the distribution target.

SUMMARY OF THE INVENTION

It is therefore a primary goal of the present invention to provide a system and method for automatic distribution of a telephone communication from a caller to a user, wherein the user is one of a first plurality of members of a group of potential communication recipients, including a matrix switch, a first telephone line carrying a call from the caller, a second telephone line accessible by the plurality of members, a plurality of criteria, for determining which one of the first plurality of members will be the user, and a call control means connectable to the matrix switch and to the first and second telephone lines, for accessing the plurality of criteria, selecting the user from the first plurality of members in a manner based at least in part upon the criteria, and controlling the matrix switch to initiate and maintain a connection between the matrix switch and each of the first and second telephone lines.

The present invention further provides a system (and a related method) for automatic distribution of a telephone communication from a caller to a selected one of a plurality of agents having respective wireless telephone terminals registered in a wireless telephone network, wherein the selected agent is not predetermined by the caller and is a member of at least one of a plurality of groups of agents, each member of each of said groups being capable of performing at least one of a plurality of agent services needed by the caller, the system comprising a matrix switch, call control means for controlling the matrix switch and connecting the matrix switch to a first telephone line in response to a first telephone call from the caller via the first telephone line, and, in further response to the first call, for connecting the matrix switch to a second telephone line accessible by the plurality of agents across the wireless telephone network, selection means for gathering and analyzing a plurality of caller criteria and determining whether the first call is directed to one of the plurality of groups, and, if so, determining which of the plurality of agent services provided by the agents within the group is needed by the caller, and for selecting at least one of the agents within said group as the agent to be connected to the caller in a manner based at least in part upon which of the agents within said group can provide the needed agent service at the time of the call from the caller, the call control means being connected to the selection means to access information identifying the selected agent, and to the matrix switch to connect the first telephone line to a communication path interconnecting the matrix switch and the wireless telephone network via the second telephone line, thereby establishing a telephone communication link between the caller and the selected agent's wireless telephone terminal via the wireless telephone network.

DETAILED DESCRIPTION OF THE INVENTION

The present invention provides intelligent and automatic call distribution targeting an individual person via wireless or wired communication media, instead of targeting a device.

The invention provides for group membership by individuals and/or groups. The caller, either from within or without the call center, specifies the group to contact and reaches a member of that group. The caller does not have to specify a particular member of the group to reach a qualified user to answer the caller's questions or perform a task required by the caller.

Membership in a particular group is not an exclusive attribute. A member of a group can concurrently be a member of other groups. A group member's relationship to the group is determined by the membership type. A group member can have more than one relationship to a group, each relationship determined by a unique membership type. The membership type contributes to the preferred method of intelligent call distribution and can be changed dynamically by any qualified subscriber or statically by a single system technician.

The invention allows for individuals within a group to be mobile and associated with any set or type of telephony devices, whether wired or wireless, and allows individual users within a group to change their telephony devices dynamically. Calls can be delivered to an individual at a telephony device, or an individual can call into the system from a telephony device and connect to the caller.

RULE-BASED CALL DISTRIBUTION

Calls are intelligently distributed to group members based on a number of criteria referred to herein as rules. The rules may be changed in a dynamic fashion by users or system administrators, as desired, and multiple sets of rules for multiple groups, settings and situations are allowable. The following list describes the items (i.e., the rules structure) used by the intelligent call distribution method and system of the present invention in arriving at call distribution decisions.

Membership Type: This rule represents the member's role within a group, such as group supervisor, group member, or voice message handler. The membership type is extensible to reflect development and change in group roles.

Member Registration: This database is used to determine which subscribers are members of which particular groups. Subscribers not appearing in the member registration database are not members of any group.

Device Registration: This database tracks information specific to various wired and wireless devices, determines which wired or wireless devices are available, their current status, current location, who is using each device, and routing information.

User Registration: This database tracks information specific to subscribers in the groups, determines which device to use to reach them, their availability status, their location from a network and a geographic view. This database can also retain personal profiles of subscriber preferences relating to wireless ACD functions.

Current Group Status: This is the information about the function of the group as a whole. It describes how members in the group relate to each other—for example how members contact other group members. It also describes how calls are handled within the groups. For example calls may be distributed evenly to all members or delivered only to the next free agent. The database also contains a group profile of preferences relating to wireless ACD functions.

Call Status: This call-related information can help in determining how the call is processed and in what order. For example the call waiting for an agent the longest will be delivered to the next available agent, or calls from customers with priority contracts can be moved up to the beginning of the waiting queue.

Call State: This is information about a call at a particular instance. For example, the caller could have waited for an agent longer than some specified time. The call status would then change from a wait in queue state to a leave voice message state and would no longer be deliverable to an agent.

User Defined Registration: This is a customer defined or supplied database which contains objects to track for registration. The objects could be customer accounts and contain information about the sales representative, order status and receivables. For example, if an account is overdue, the call could be delivered to the group member who is responsible for collecting overdue accounts. This database can also contain user-defined object status information which can be changed according to the object's definition.

DATABASE INTERACTION AND INTEGRATION

The invention extends the prior art wired telephone ACD function to mobile and geographically dispersed groups or users. There are a number of ACD enhancements described below to address unique characteristics and requirements of a group whose members may be mobile and geographically dispersed.

The invention involves integrating the following telephone call attribute databases and mechanisms into both a wired and wireless setting:

Individual Registration in a Group: Describes whether an individual is a member of a group and the individual's relationship with that group.

Device Registration: Tracks the devices available for intelligent call distribution. The device registration can be set either dynamically or statically, and can be addressed in a number of forms. This database also keeps track of the current status of the device, such as busy, not responding, etc., for use as one of the intelligent call delivery criteria.

User Registration: Tracks the individuals in a real time dynamic fashion and contains the association between individuals and their currently assigned devices, to which calls can be intelligently delivered. This database also keeps track of the current status of the individual such as busy or unavailable, to use as part of the intelligent call delivery.

Alerting: Indicates to one or more individuals within the group that a call event which is meaningful to the group has occurred. Example events include call arrival, call abandonment and call pickup by a member of the group. The intelligent call distribution mechanism will determine what subset of the group will receive an alerting indicator. This subset can be either the entire group, some particular subset, a single individual in the group, or a null group, leading to no alert.

Call Connect: Allows the individual within a group to communicate and talk with the caller via a number of telephone devices. Example devices include cellular telephones, wired telephones, and 2-way SMR. The calls can actually be moved from one device to another as disclosed in U.S. Pat. No. 5,140,626 to Ory, et al., incorporated herein in its entirety by reference. The call can actually occur on multiple channels simultaneously depending on the communication medium used, such as voice, data or FAX. This invention proposes methods to associate these media to accomplish meaningful tasks with increased efficiency.

Status: A catchall category including a number of different data items in the ACD. It includes, for example, the status of current members, status of devices, calls in progress, call history, alerts, and alerts history. Status can be used for: resource (device, individual, group, channel) utilization and optimization; input into the intelligent call distribution mechanism; and use by group members for performing tasks (such as answering the next available caller) and planning activities (such as a work break).

PREFERRED HARDWARE ENVIRONMENT

FIG. 1 shows the connectivity of various functional units used or incorporated with the present invention. Each block describes a functional unit. The Cellular Switching Network 10 is accessible by dialing standard telephone numbers, as are the SMR Network 160 and the Wireless PCS Network 20. These numbers are generally "off-premise" in relation to the organization's switching systems 80 and 50. Any wireless network which can connect to the Central Office Switching Network 40 can be supported by the present invention. The Central Office Switching Network 40 provides local loop service connecting the organization's switching system 80 to the cellular switching network 10, the SMR network 160, the Wireless PCS 20 or other wireless networks. Networks of antennae 30 exist for cellular, SMR, and wireless networks providing radio frequency communications with the cellular phones 140, SMR handsets 180, and personal communications handsets 150.

On-premise wireless handsets are supported through a wireless handset interface 70 which connects directly to the PBX Switching Network 80. The wireless handset interface 70 communicates with handsets 110 on the customer premise. Standard analog telephones and digital feature phones 120 are connected directly to the on-premise PBX Switching Network 80.

For organizations with centrex service, the analog telephones and digital feature phones 130 are connected directly to the Central Office switching network 40 within a centrex partition 50.

Any Local Area Paging Network 200 and Wide Area Paging Networks 190 can be used for transmission of notification of calls. The alerting function can utilize any one-way radio network. These one-way radio networks utilize networks of antennae 30 for radio frequency communications.

The PCS platform, which performs the inventive functions described herein, is located in either the central office 60, or on-premise 90. The PCS platform may connect to any number of switching nodes within the Central Office Network 50, any wireless network, or any on-premise networks to provide the wireless ACD service.

The PCS platform can connect to the Customer Object Registration Database 170 through any available data communication connection such as Local Area Networks, or Wide Area Networks. The access to this database is to provide customer specific rules for distributing calls to agents.

PERSONAL COMMUNICATIONS SERVICE

Figure 2:
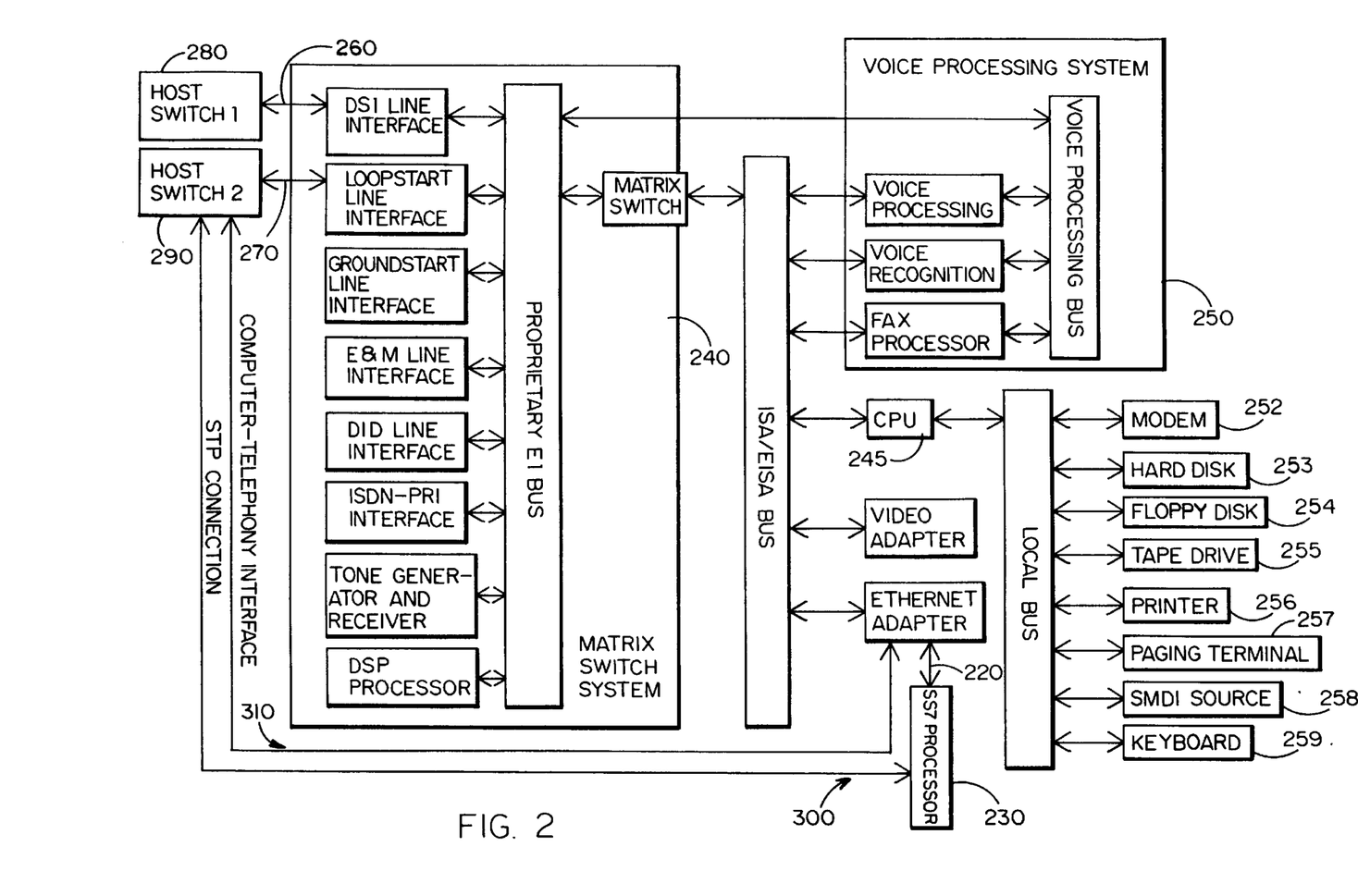
FIG. 2 is a block diagram of the inventive PCS system.

The PCS 60 or 90 is one of the mechanisms through which the method and system of the present invention are implemented. A block diagram of the PCS is shown in FIG. 2. The tandem matrix switch 240, voice processing components 250, computer-telephony link 310 and/or an SS7 interface 300 are the mechanisms through which the desired call control is obtained. The Host Switches 280 and 290 represent external switching platforms. The SS7 Processor 230 is a separate computer purchased on the open market which has a TCP/IP interface 220, and is connected to a Signal Transfer Point on the SS7 network. The Computer-Telephony Interface 310 is connected to a PBX and can be either over a TCP/IP Local Area Network Interface 0220 or can be a wide area connection such as X.25.

The system of the present invention is directly connected to the user organization's switching system. The modes of interconnection 260 and 270 can be through any digital feature phone interface, ISDN basic rate, ISDN primary rate, SS7 common channel signalling, Computer-Telephony Interface and standard telephone interfaces, feature group "D," SMDI (SMSI) accompanied with standard lines, or any combination of the above. The interface must provide a means of determining the called party, and optionally the calling party. Furthermore, proper function of the system of the present invention depends on the types of call controls available with each interconnection method.

Callers typically dial the business telephone number of their desired party. For the preferred wireless ACD embodiment of the present invention, the called party is any member or agent of the ACD group designated to handle the call after analysis under the rules. The organization may provide direct inward dial, permitting callers to directly select the group providing the service. Other organizations may provide a receptionist, human or automated to route callers to their desired group.

After the desired number of rings, the call will forward using conventional means to the PCS 60 or 90. Upon arrival, information about the called party and calling party will be obtained using common methods such as SMDI, ISDN, Feature Phone Emulation, SS7 or Computer-Telephony Interface. If the called party, also referred to herein as the subscriber and the user, has registered a cellular telephone, SMR handset, or PCS handset with the PCS database, the caller will be prompted to hold while the call is routed, and the cellular telephone, SMR handset, or PCS handset will begin ringing.

USER SELECTION AND NOTIFICATION

Once the system has selected the appropriate group, the wireless ACD selects an agent within the group to receive the call. The wireless ACD will select an agent who is available and who meets any of the other criteria listed above, as desired for the particular inventive ACD configuration implemented. An agent can be unavailable by already servicing a call or indicating to the wireless ACD that they are unavailable.

The wireless ACD can select the available ACD agent based on a number of methods or rules. Central Processing Unit (CPU) 245 and computer bus and peripherals 251 through 259 support implementation of this rules-based approach in a manner known in the art. The rules can incorporate and refer to any of the information described above. If there are several agents who equally qualify under the rules to receive the call, then various distribution methods can be employed to evenly distribute calls to the agents.

Once an agent within a group has been selected to receive a call, that agent can be notified or alerted that a call is waiting to be serviced. Notification can be completed through wireless or radio transmission. Thus, the agent is available without being tied to any particular telephone or location. Delivery of a call is to an agent, not to a particular telephone as in the existing art.

One method of alerting is using a radio paging system to transmit an analog or digital page to a pager. The geographic coverage limitations of a radio paging system are derived from frequency and transmitter power and location. Another method of alerting is to use wireless message data networks (connectionless radio networks) to deliver a message to a wireless terminal, a personal digital assistant, a portable personal computer with a wireless receiver, or personal information manager. These networks can use one-way transmission from the base station to the receiver or can be two-way bidirectional networks.

Another method of alerting is using wireless modems for dedicated circuits for the duration of the message to deliver a message to a wireless terminal, a personal digital assistant, a portable personal computer with a wireless receiver, or personal information manager. This feature can be embedded in specialized radio networks, cellular control channels, or cellular voice channels. These networks can be one-way networks or two-way/bidirectional networks.

Yet another method of alerting is using packet data radio networks (either connection oriented or connectionless) to deliver a message to a wireless terminal, a personal digital assistant, a portable personal computer with a wireless receiver, or personal information manager. This ability can also be embedded in specialized radio networks, cellular control channels, or cellular voice channels utilized for packet radio use, on either one-way or two-way/bidirectional networks.

USER ACCESS

After a rule-based agent selection is made and the agent becomes aware of an alert from the networks, he or she can go to any convenient telephone, such as a land-line telephone, a cellular telephone, an SMR or PCS handset, or any device used for wireless voice communication tied to the telephone network, and call the PCS 60 or 90. When the PCS receives the call, it can play a voice recording through the voice processing system 250 to ask the caller to give his identity. The agent then gives his own identity to the PCS 60 or 90 and the PCS will cross-connect the caller and the agent through the matrix switch system 240 to allow the caller and agent/subscriber to conduct their business.

Another embodiment of this invention includes combining the alerting and voice communication functions into the same set of channels. In the use of land-line cellular, SMR, or PCS networks, the agent sets a follow-me number which identifies how to reach the cellular telephone, SMR or PCS handset in order to receive ACD-delivered calls. When the agent is selected for an arriving call, the wireless ACD will dial the follow-me number to deliver the call to the designated wire or wireless voice terminal.

When the agent answers the call, the PCS 60 or 90 will play a recording through the voice processing system 250 indicating that a wireless ACD call is waiting for the agent. The PCS 60 or 90 will cross-connect the caller and the agent through the matrix switch system 240 so the caller and agent can talk to each other and conduct their business.

Tandem Switching Embodiment

The preferred embodiment PCS incorporates a tandem switch for the matrix switch system 240 to provide the features described above. Any tandem switch could be used, such as the Excel PCX512 manufactured by Excel, Inc. of Sagamore Beach, Mass. The tandem switch 240 carries the call either passively (without the callers knowing) or actively (with voice prompts and instructions). The tandem switch 240 can convert from one signalling protocol to another and from one voice encoding method to another. For example, the tandem switch 240 can connect ISDN primary rate lines to analog lines. This capability for protocol conversion is required to connect calls from a variety of sources.

A call will arrive at PCS 60 or 90 after being directed there by the host switch, either a PBX 80 or Central Office Switch 40 as part of a centrex partition 50 with information about who was called, and optionally, who is calling. The information may be transmitted with the call or out-of-band using standing mechanisms available to those skilled in the art, including but not limited to, SMDI (SMSI), ISDN Primary Rate, ISDN Basic Rate, Proprietary Feature Phone Interface, Inband DTMF, Feature Group "D," Computer Telephony Interface, and SS7 Common Channel Signalling. The call will arrive on the tandem switch 240 via one of the supported protocol interface components.

The PCS 60 or 90 will use this information and if it causes the PCS to select a wireless ACD group, the rules for the group will be accessed and acted upon to select the next available agent to whom the call is to be delivered. The PCS will use this information about the selected agent to either immediately begin the sequence of steps to alert the agent via wireless networks that a caller is waiting, to connect the caller to the wireless device if the device is part of a two-way bidirectional voice network, or to prompt the caller for information used for screening purposes.

If the screening process requires voice processing elements 250, they are connected to the arriving call by the tandem switch 240. Standard voice processing elements are used, such as the Dialogic (TM) D121 Digital Signal Processor boards manufactured by Dialogic, Inc., Parsippany, N.J. Additional voice processing boards may be used for reception of facsimile, modem data calls, or voice recognition. For example, the Dialogic (TM) Fax120 Fax Processor boards manufactured by Dialogic, Inc., Parsippany, N.J.

The voice processing elements can be used to perform many functions, including playing selection menus, performing voice recognition and gathering DTMF digits, to obtain the screening information desired.

The arriving call will be placed on hold, or parked by the tandem switch 240. The caller may hear ringback, music on hold, prompts, or silence, depending on the desired application set.

To transmit an alert to a one-way paging network, the PCS 60 or 90 will either transmit the text message via a paging link using any of a number of industry standard paging protocols, or dial a telephone network access port on the one-way paging network and transmit the message as a sequence of DTMF tones.

To connect the caller to a wireless device, the PCS 60 or 90 will instruct the tandem switch 240 to outseize a new communication path to the host switch 40 or 80, respectively. If the PCS is connected to a PBX 80, then the outseize will be propagated to the central office. This outseize can take many forms, depending upon the signaling protocol used for the connections 260 or 270. The outseize will be propagated to the wireless transmission source 10, 20, 70, 160, 190, or 200 through the central office switch 40, or the PBX 80 as required. The outseize will be complete when the digits desired have been dialed or digitally communicated to the host switch, and a ringing signal (or answer) is returned.

At this point, a communication path exists between the wireless transmission source 10, 20, 70, 160, 190, or 200 and the PCS 60 or 90 through the tandem switch 240. The communication path provides complete voice and electrical signalling to support a telephone call.

The wireless transmission source 10, 20, 70, 160, 190, or 200 will then begin alerting the wireless handsets 110, 140, 160, 180, or 210 which, if within radio reception range, will emit an audible, visual or tactile physical stimulus to the selected agent. If the wireless handset is answered, answer supervision will be returned from the handset to the wireless transmission source 10, 20, 70, 160, 190, or 200. Once the answer has been returned to the wireless transmission source 10, 20, 70, 160, 190, or 200, the communication path is allocated, and the talk path between the handset 110, 140, 160, 180, or 210 and the wireless transmission source 10, 20, 70, 160, 190, or 200 is complete.

The wireless transmission source returns the answer supervision to the central office switch 40 or PBX 80 which propagates the signal to the PCS 60, or to the PBX switching network 80, whichever is appropriate. In the latter case, the PBX forwards this answer supervision to the PCS 90.

The PCS will optionally wait for an answer, and then instruct the tandem switch 240 to connect voice processing elements 250 to the call to play a menu to the subscriber providing screening information. The subscriber may choose to answer the call, place the call in voicemail, or re-route the call to another number. The choice is entered using voice processing means such as DTMF key presses, or voice recognition. The choice is affected by the tandem switch 240, and cooperating voice processing elements 250. If the call is accepted, the tandem switch will disconnect all voice processing elements 250, and connect the caller to the subscriber.

PBX EMBODIMENT

Figure 3:
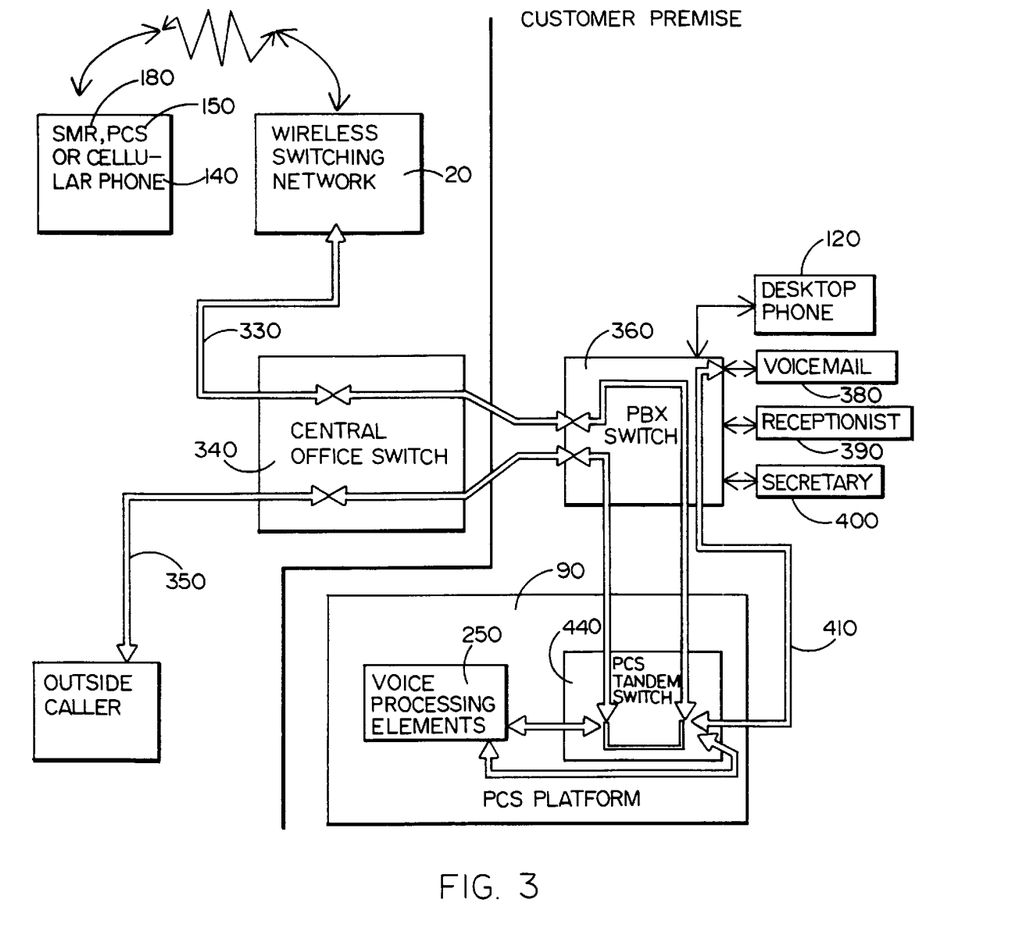
FIG. 3 incorporates a wireless subscriber into an ACD system.

FIG. 3 shows the preferred hardware embodiment utilizing a PBX. Arriving call 350 is extended through the central office switch 340 to the on-premise PBX or centrex partition 360. The call is routed directly to the PCS for voice processing at voice processing element 250. The call will be answered by the tandem switch 440. When the call arrives, information about who is calling, and who was called is obtained through various mechanisms not shown, but known to those skilled in the art. When the call arrives, the PCS 90 will determine whether the called party is a group, and if so, retrieve the rules for the group and select the next available agent to receive the call. The tandem switch 440 will hold the call throughout the length of the call, permitting connection and reconnection to off-premise SMR, PCS or cellular phones 140, 150 and 180, other desktop phones 120, voicemail 380, receptionists 390, and secretary 400, or to any other dialable address. This mechanism doesn't violate the PBX's rules about trunk-to-trunk connections, since the calls originating from the tandem switch 440 appear to the PBX as new calls.

The various methods of screening are all implemented using voice processing elements 250 which are connected on demand to either the arriving call 350, or outbound calls to the SMR 180, PCS 150 or cellular phone 140, desktop phones 120, voicemail 380, receptionist 390, or secretary 400 or to any other dialable address.

Should a data transmission to provide screening information be desired, either through some computer network, or through a wireless network, like a paging network, then the transmission is dispatched from the PCS. Further disclosure on this feature can be found in U.S. Pat. No. 5,140,626 to Ory et al, incorporated herein by reference in its entirety.

When the inbound call 350 is connected to an outbound destination 330, 410 or any of the destinations mentioned above, a "bridge" connection is established between the two calls by the tandem switch 440. The tandem switch 440 may adjust the electrical characteristics of the calls to compensate for signal loss or gain by padding the connection with the appropriate number of + or − decibels. The tandem switch 440 may also convert the voice coding on one portion of the connection to a potentially different voice coding on another portion of the connection. For example, converting from mu-law to a-law PCM encoding.

Now, PBX 360 has two separate calls, the inbound call 350, and the outbound call 330, 410 to the destination. Each call is independent with respect to the other from the viewpoint of the PBX 360 and the Central Office Switch 340. The PCS Tandem Switch 440 is instructed to park the remaining call when either call disconnects. This provides the necessary call control required to embody these inventions.

While joining calls may be currently known to the skilled artisan, this form of "third-party" ACD call control is unique as it is consolidated with the integration of off-premise wireless telephones to an organization's on-premise switching system.

Embodiments Based On SS7—Advanced Intelligent Network

The next two embodiments of this invention are based on out of band signalling connections known to those skilled in the art as SS7. SS7 is a data communication and networking protocol defined for use in telephone networks originally by AT&T (pre-divestiture) and Bellcore (post-divestiture). The protocols have been picked up by both ANSI's T1 committee for United States use and by ITU-TSS for international use. The protocol architecture roughly follows the ISO OSI protocol stack. We refer to Table 1 for a compatability description. We also note that, while only the protocols within SS7 relevant to this invention are described, details on the entire stack can be obtained through a number of standards organizations including: ITU-TSS, ANSI T1, TIA, ETSI, and Bellcore.

TABLE 1

| | SS7 Compatible Protocols | | | | |
|---|---|---|---|---|---|
| OSI stack layer | ISDN | GSM | AMPS cellular | AIN | Telephone |
| 7 - Application | ISUP | MAP | IS - 41 | INUP | TUP |
| 6 - Presentation | | | TCAP | | |
| 5 - Session | | | | | |
| 4 - Transport | | | | | |
| 3 - Network | | | SCCP | | |
| | | | MTP3 | | |
| 2 - Link | | | MTP2 | | |
| 1 - Physical | | MTP1 (V.35 or DS-0) | | | |

For the purposes of this invention, TUP and ISUP are used purely for call control.

MAP (GSM) and IS-41 are used to interact both on a call and non-call associated basis with cellular switching system. The use of these protocols allow for such functions as short messaging, obtaining mobile device status and location, and initiate calls directly to the mobile device.

The goal of the advanced intelligent network (AIN) concept is to reduce the time required to implement a new service from between two to five years, using conventional technology, to less than six months, using AIN technology.

An advantage of incorporating AIN is that all the software commonly required for a range of services is already included on a stable platform that seldom changes. Consequently, when a new service must be designed and programmed, only the parts that are unique to the service need to be developed and placed on the platform to make the service ready for distribution and use. Furthermore, the unique service parts are based on highly sophisticated programming by means of service-independent building blocks (SIBs). The "programming" of a new service will therefore differ considerably from conventional programming. A suitable range of SIBs will be put together to form a service, and, once appropriate parameters have been set, the service will be ready. In the near future, using the intelligent network concept, a new service will be introduced in months or perhaps even weeks, provided all the SIBs needed already exist. If a SIB is missing and must be designed, it will necessarily take longer to introduce a service. But the probability that all the SIBs required for a new service on a major intelligent network will actually exist should in future be close to 100% because the growing number of services on the intelligent network will result in a growing library of SIBs. For further information, the reader is directed to *Intelligent Networks*, Jan Thorner, Artech House 1994.

For the purposes of this invention, AIN provides more call interaction capability in a standardized manner than existing proprietary Central Office switch systems. The PCS can interact with the caller in a distributed processing capability with more Points In Call of a Basic Call Model. The Points In Call can be accessed by activating triggers in the SSP or Adjunct Processor. Note that the particular Points In Call available depend on which version of AIN is deployed. The service logic to deploy the ACD capabilities encompassed in this invention can exist either in the SCP (Switching Control Point), the Intelligent Peripheral (IP, in this case the PCS) or the Service Switching Point (SSP), or Adjunct Processor. The PCS will interact with the caller and subscriber based on this ACD service logic and provide the capabilities outlined in this invention.

An SS7 embodiment contains some additional capabilities which will optimize the trunk utilization of the processes described in the tandem switching embodiment. A tandem switch is still required to connect the various voice processing means, and to interface to the telecommunications network. The additional element, an SS7 interface processor, provides several improvements to the invention described with just a tandem switch.

The SS7 interface processor can provide information about arriving calls, to include called party, calling party, and other useful network based information.

Calls can be redirected, without answering, providing a mechanism for ringing cellular telephones without tying up two trunks.

Triggers can be set to provide call control when certain numbers are dialed, and when hang-ups are detected. The specific use of triggers depends on which AIN version is implemented and which Basic Call Model is employed. In fact several AIN versions may be encountered in the same network.

Figure 4:
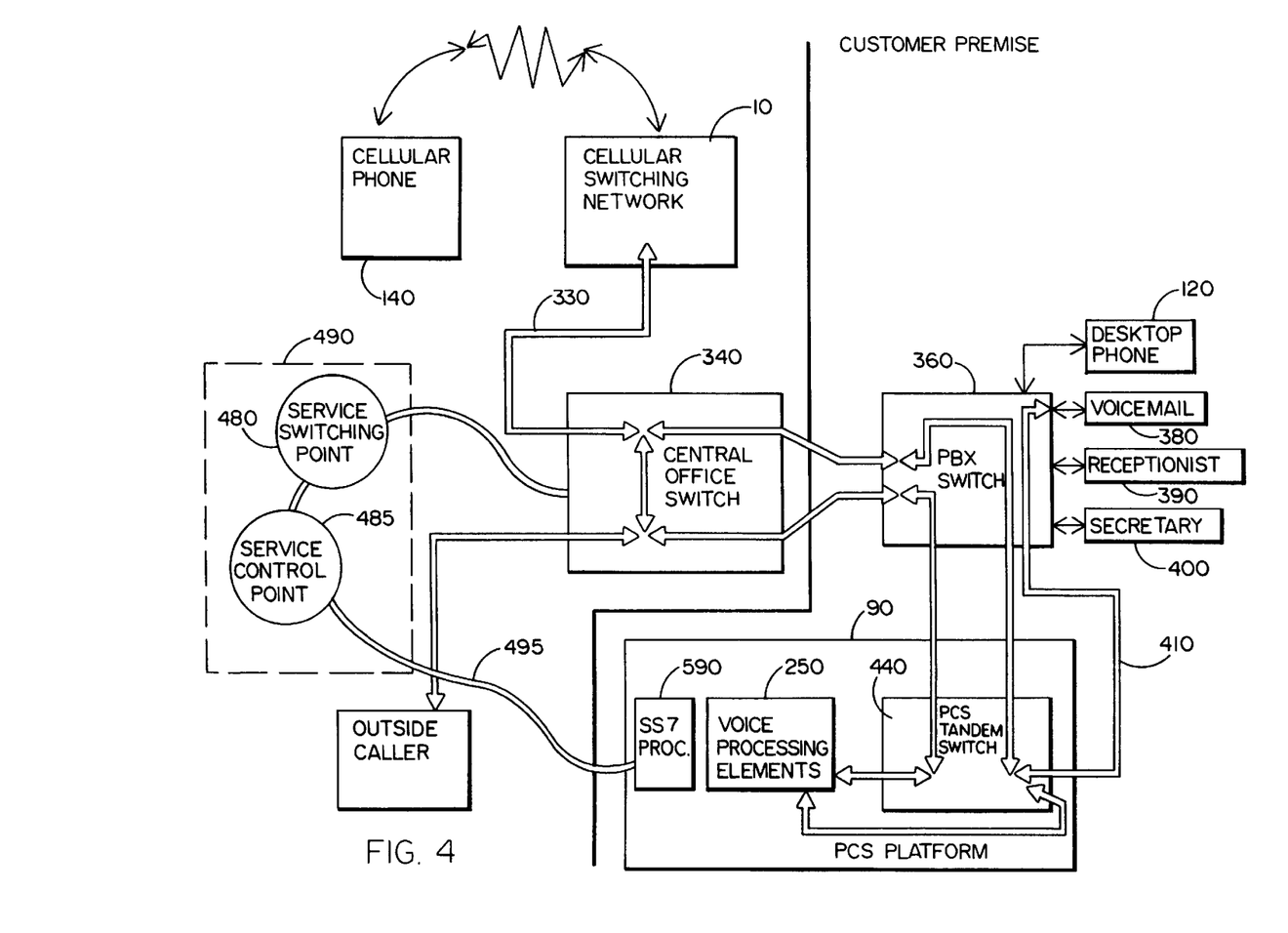
FIG. 4 provides an example of a wireless subscriber to an ACD system incorporating an intelligent network.

These triggers are set-up with the Service Switching Point SSP 480, shown in FIG. 4, based on selecting the appropriate Points In Call. Information and call control are returned when these "triggers" are "fired".

FIG. 4 shows the SS7 network 490 carrying Intelligent Network messages (in enhanced ISUP messages), connecting to the PCS platform 90 through the SS7 interface processor 590 and to the central office switch 340. Any SS7 interface processor could be used, such as one manufactured by EBS of Connecticut. When a call is to be routed from off-premise to off-premise, the SS7 network can be used to perform either a "release-link" operation or to join the calls.

Note that the SS7 link 495 can either be a direct link to the SSP, a direct link to the SCP 485, and/or can be routed to the appropriate SS7 nodes by a Signal Transfer Point (STP), shown in FIG. 2 (300) and known to the skilled artisan.

Triggers may be activated with the originating or destination SSP via the SS7 network 490 to gain control of the call once a hang-up has occurred on either end of a call.

The call flow utilizes the same flow as in the previously described embodiment (See "Tandem Switching Embodiment" above) with the difference being that the call related information is carried over the SS7 network 490 to the PCS 90 through the SS7 processor 590, and call control on other AIN nodes (SCP, SSP, IP, and Adjunct Processor) is influenced by SS7 messages sent by the PCS 90 to other AIN nodes (SCP, SSP, IP, and Adjunct Processor) over the SS7 network 490.

As mentioned earlier, the service logic executed to perform the ACD service may or may not reside on the PCS 90 in whole or in part. The service logic components not residing on the PCS 90 will reside on other AIN nodes (SCP, SSP, IP, and Adjunct Processors).

Cellular Network Direct Connection Embodiment

Figure 5:
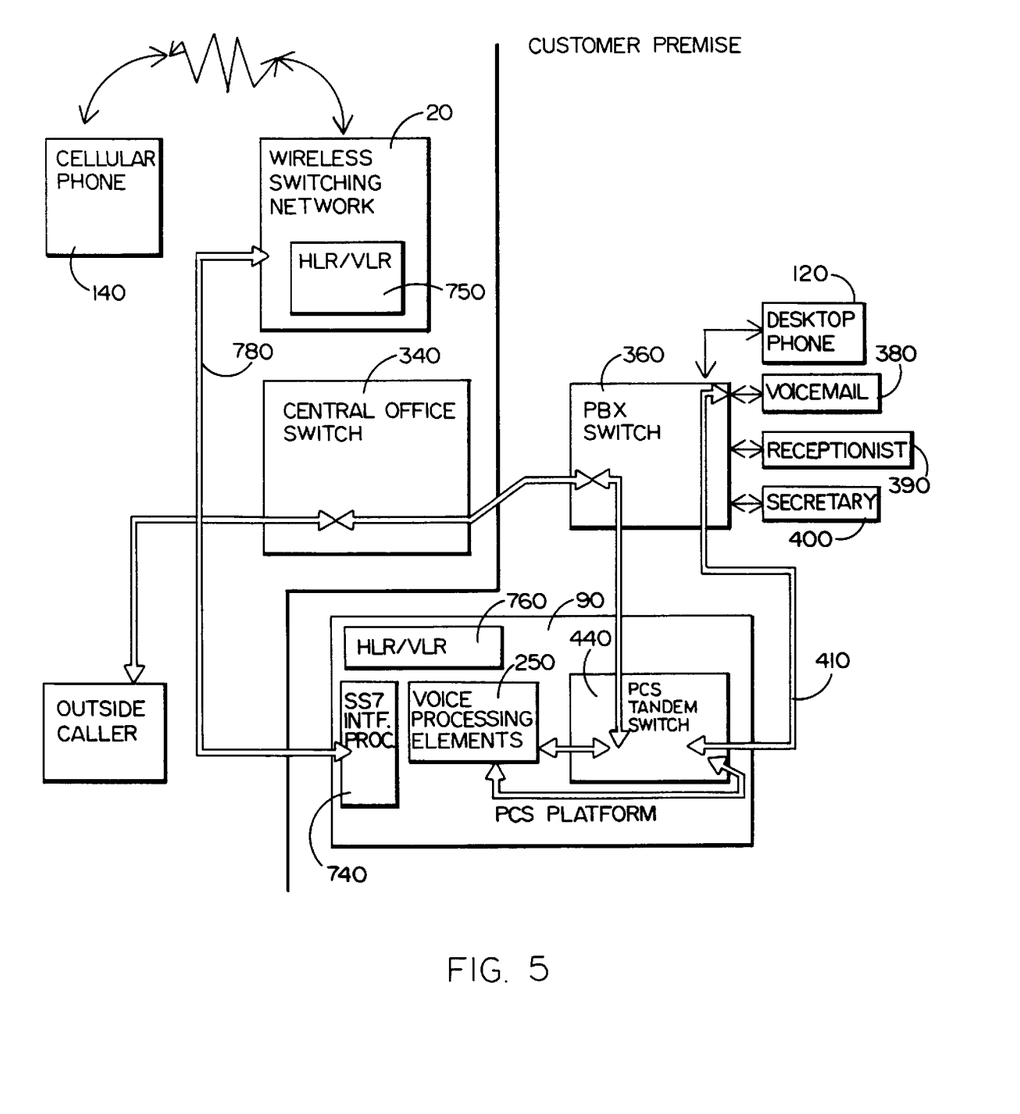
FIG. 5 provides an example of a wireless subscriber to an ACD system incorporating a cellular network direct connection.

Yet another embodiment, illustrated in FIG. 5, contains some additional capabilities which will optimize the trunk utilization of the processes described in the tandem switching embodiment. A tandem switch is still required to connect the various voice processing means, and to interface to the telecommunications network.

This embodiment supports wireless networks utilizing Home Location Registers (HLR) and, optionally, Visitor Location Registers (VLR). There can be multiple HLRs and VLRs in the wireless switching network.

The HLR is the location register to which a user identity is assigned for record purposes such as subscriber information (e.g., ESN, DN, Profile Information, Current Location, Validation Period). The HLR may, or may not, be located within and be indistinguishable from an MSC. The HLR may serve more than one MSC. The HLR may be distributed over more than one physical entity.

The VLR is the location register other than the HLR used by an MSC (Mobile Switching Center) to retrieve information for handling calls to or from a visiting subscriber. The VLR may serve more than one MSC. For further details on both HLR and VLR, see IS-41.1C (draft) of Telecommunications Industry Association (TIA) TR-45.2 project labeled "Cellular Radiotelecommunications Intersystem Operations".

The MSC (Mobile Switching Center) is the cellular network equivalent of the PSTN's Central Office Switch providing additional functions relating to frequency control, frequency allocation, and cell switching.

The PCS will utilize the HLRs and VLRs to obtain the status of subscriber's wireless devices prior to attempting to alert or ring the subscriber. If the device is unreachable (out of roaming area or turned off for example) specialized and optimized call treatment can be made such as selecting another agent in the group rather than waiting for some service announcement and timing out on the call.

Calls can also be routed to the appropriate current cellular serving area directly by accessing the HLR/VLR and negotiating a connection to the current cellular serving area for the cellular subscriber.

The PCS 90 can utilize its own HLR/VLR 760 and the Wireless Switching Network's HLR/VLR 750 together, or can utilize the Wireless Switching Network's HLR/VLR 750 exclusively.

The SS7 interface processor 740 connects to the wireless switching network via digital links 780. The digital links carry both digitally encoded voice channels and S7 control messages. The control handshaking is via IS-41 messages carried on TCAP messages. Other direct connection methods such as the A+ interface to wireless base stations can also be used.

The SS7 interface processor 740 can provide information about arriving calls, to include called party and calling party and other useful information.

The control channel on digital link 780 can be used to rapidly determine if an SMR handset, PCS handset, or cellular telephone is powered on, registered in a wireless switching network. The control channel on the digital link 780 can also send an alert or ringing directly to the wireless base station, bypassing call setup requirements of the Central Office Switch 340.

The call flow utilizes the same flow as in the previously described embodiment (See "Tandem Switching Embodiment" above) with the difference being that subscriber related information is carried over the SS7 network to the PCS 90 through the SS7 processor 740, and subscriber device status on other MSC nodes (MSC/HLR/VLR) is influenced by SS7 messages sent by the PCS 90 to other MSC nodes (MSC/HLR/VLR) over the SS7 network.

The PCS 90 can also provide additional enhanced services to SMR handsets, PCS handsets and cellular telephones which utilize the PCS HLR 760 directly.

The PCS 90 can send text messages for subscriber altering using the IS-41 or GSM SMS (short message service) capability similar to text paging.

Calls can be redirected, without answering, providing a mechanism for ringing cellular telephones without tying up two trunks. Calls can also be re-routed as the wireless device user travels from cell site to cell site and changes networks to optimize billing charges.

Call processing is similar to the tandem switching embodiment discussed above up to the point the wireless device is dialed. Instead of dialing through the central office switch 340, the PCS 90 will determine if the wireless device is owned by the PCS Home Location Register 760 or currently owned by the PCS Visitor Location Register 760. If the device is owned, then the local information is used. If the device is not on the local PCS Home Location Register 760, does not exist in the PCS HLR/VLR 760, or the PCS VLR 760 record is not current, then the PCS 90 will query the wireless device's HLR 750 for current information.

If the wireless device is unavailable in either HLR/VLR 750 or 760, then other call processing steps will be performed such as sending the caller to another ACD group member, voicemail 380, the receptionist 390, or a secretary 400. If the wireless device is active, then a connect or ringing command will be sent to notify the agent of a waiting call. If the agent does not answer, then further call processing will be performed such as sending the caller to another ACD group member, voicemail 380, the receptionist 390 or a secretary 400.

Computer-Telephony Interface Embodiment

Figure 6:
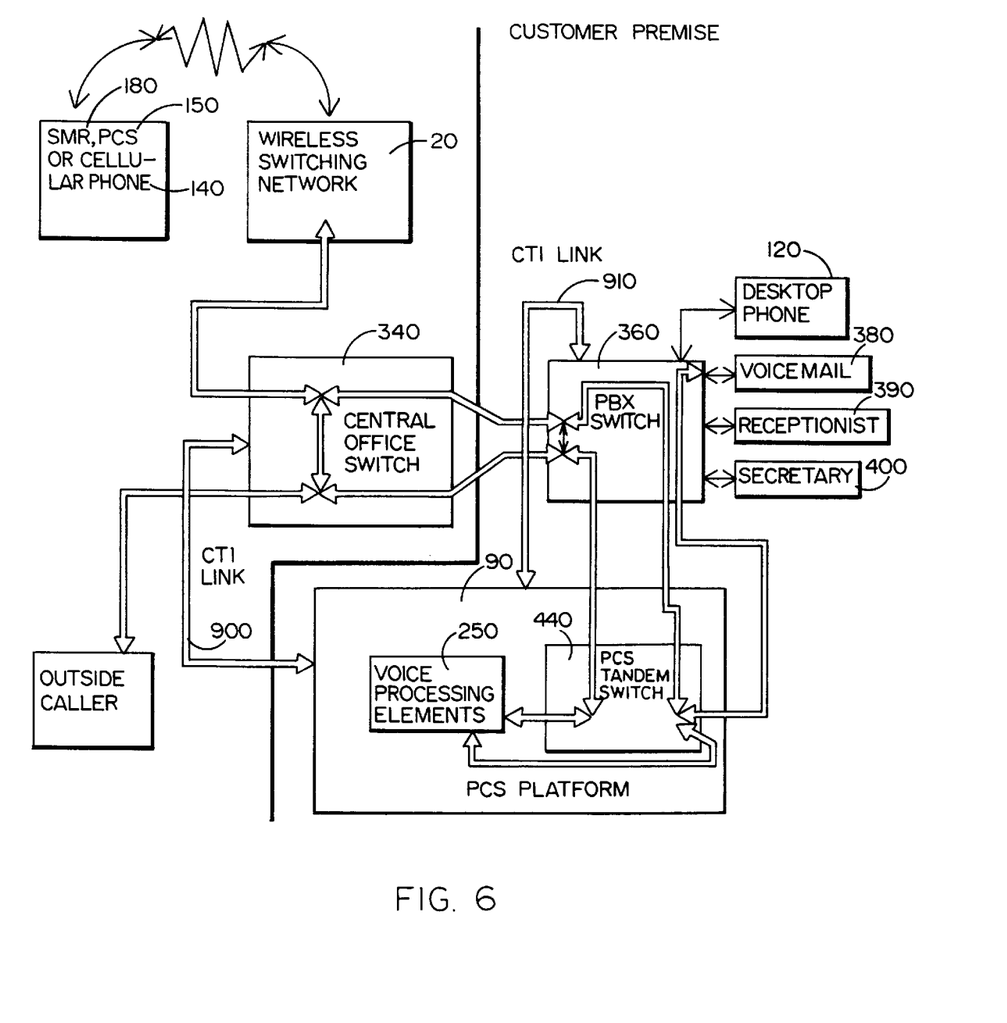
FIG. 6 provides an example of a wireless subscriber to an ACD system incorporating a computer telephony interface.

Another embodiment, illustrated in FIG. 6, contains some additional capabilities which will optimize the trunk utilization of the processes described in the tandem switching embodiment. A tandem switch is still required to connect the various voice processing means, and to interface to the telecommunications network.

A CTI (Computer-Telephone Interface) link is generally applied to Customer Premise Equipment and generally is any link between a PBX and a data processing computer where the computer has third party call control to direct telephone calls based on various call and non-call related information.

Third party call control is defined as control by a system or party within a system distinct from the system making the call, providing the call destination, or performing call control. This contrasts with first party call control wherein call control operations are executed on calls originating from or terminating at the call control system.

CTI is more specifically taken to apply to those links between a PBX and a data processing computer which adhere to some open standard, either those published by some open standards body or available from a vendor in an open non-discriminatory basis relating to the vendor's proprietary CTI protocol.

The most common standard used is the Computer Supported Telecommunications Applications (CSTA) specifications contained in ECMA's ECMA-178 "Services for Computer Supported Telecommunications Applications (CSTA) Phase II", ECMA-1281 "Scenarios for Computer Supported Telecommunications Applications (CSTA) Phase II", ECMA TR/52 "Computer Supported Telecommunications Applications", ECMA-179 "Protocol for computer Supported Telecommunications Applications (CSTA) Phase II".

CTI links generally provide for additional call related information about calls not generally available to a telephone connected to a PBX. The CTI link also allows the adjunct processor (in this case the PCS 90 shown in FIG. 6) to perform advanced call control activities such as call transfer, set up conference calls, etc.

As in the case of the SS7 embodiment, the CTI links 900 and 910 are data communication links between the data processing equipment or adjunct processor (in this case the PCS 90) and the PBX 360 and/or Central Office Switch 340. The CTI links 900 and 910 provide out-of-band call information and control separate from the voice communication channels.

The CTI links 900 and 910 provide what is known as third-party call control for the PCS 90. The CTI links enable the adjunct processor (PCS 90 in this case) to remotely control switching and call handling functions within the PBX 360 or Central Office Switch 340.

The CTI Link provides several improvements to the art described with only a tandem switch. The CTI interface can provide information about arriving calls, to include called party, and calling party, and other useful information. Calls can be redirected, without answering, providing a mechanism for ringing cellular telephones connected to the PBX without tying up two trunks. The status of a directly connected telephone can be determined via the CTI links 900, 910. This allows the PCS to determine whether a desktop phone is busy without attempting to signal the device and reduces the time needed to locate a subscriber before providing alternate call coverage.

FIG. 6 shows CTI links 900 and 910 carrying CTI messages associated with incoming calls from the Central Office Switch 340 or PBX Switch 360. If an agent has a follow-me number set to ring a desktop phone 120, the PCS 90 will query the status of the desktop phone 120 through the CTI links 900 and 910 to determine if it is currently connected to a call.

If a call is to be delivered to a receptionist 390 or secretary 400, the PCS 90 can query the status over the CTI link 900, 910 and deliver the call only if the telephone is free of any calls. Alternatively, the PCS 90 can hold the call until the receptionist 390 or secretary 400 hang up.

The call flow utilizes the same flow as in the previously described embodiment (See "Tandem Switching Embodiment" above) with the difference being that the call related information is carried over the CTI links 900, 910 to the PCS 90, and call control on other switches (PBX 360 and Central Office Switch 340) is influenced by CTI messages sent by the PCS 90 to other switches (PBX 360 and Central Office Switch 340) over the CTI links 900, 910.

Configurations Supported

The preferred inventive PCS can simultaneously support any combination of the tandem switch embodiment, the Intelligent Network embodiment, the Cellular Network Direct Connection embodiment, and the Computer Telephony Interface embodiment. These combinations include multiple links of any of these four embodiments to one or more PBXs and/or central office switches.

The above-detailed description was for an outside caller, calling an organization's telephone system, being re-routed to a cellular telephone, SMR handset or PCS handset. While there are other "one-number" services, none exist today that can provide the wireless ACD functionality from the customers site or the central office site, initiated by the customer's switching system (PBX) or the central office switching system.

Other embodiments include the following general combinations, wireless to inside phone, inside phone to wireless, and wireless to wireless, and more specifically:

1) Inside to outside cellular;
2) Inside cellular to outside SMR handset;

3) Outside cellular to inside;
4) Outside SMR handset to inside cellular;
5) Outside cellular to outside cellular;
6) Outside cellular to outside SMR handset;
7) Outside SMR handset to outside cellular;
8) Outside caller to outside PCS handset;
9) Inside caller to outside PCS handset;
10) Outside caller to outside SMR handset;
11) Inside caller to outside SMR handset;
12) Outside PCS handset to inside cellular;
13) Outside PCS handset to outside SMR handset;
14) Outside SMR handset to outside PCS handset;
15) Outside PCS handset to outside PCS handset;
16) Outside SMR handset to outside SMR handset;
17) Outside caller to PBX-based wireless handset;
18) PBX-based wireless handset to outside caller; and
19) PBX-based wireless handset to PBX-based wireless handset.

While the present invention has been described with reference to certain preferred embodiments, those skilled in the art will recognize that various modifications and other embodiments may be provided. These other embodiments are intended to fall within the scope of the present invention, and these variations upon and modifications to the embodiment described herein are provided for by the present invention which is limited only by the following claims.

What is claimed is:

1. A system for automatic distribution of a telephone communication from a caller, to a selected one of a plurality of agents having respective wireless telephone terminals registered in a wireless telephone network, wherein the selected agent is not predetermined by the caller and is a member of at least one of a plurality of groups of agents, each member of each of said groups being capable of performing at least one of a plurality of agent services needed by the caller, said system comprising:

a matrix switch;
   call control means for controlling said matrix switch and connecting said matrix switch to a first telephone line in response to a first telephone call from the caller via said first telephone line, and, in further response to the first call, for connecting said matrix switch to a second telephone line accessible by said plurality of agents across said wireless telephone network; and
   selection means for gathering and analyzing a plurality of caller criteria and determining whether the first call is directed to one of the plurality of groups, and, if so, determining which of the plurality of agent services provided by the agents within said group is needed by the caller, and for selecting at least one of said agents within said group as the agent to be connected to said caller in a manner based at least in part upon which of said agents within said group can provide said needed agent service at the time of said call from said caller;
   said call control means being connected to said selection means to access information identifying said selected agent, and to said matrix switch to connect said first telephone line to a communication path interconnecting said matrix switch and said wireless telephone network via said second telephone line, thereby establishing a telephone communication link between said caller and said selected agent's wireless telephone terminal via said wireless telephone network.

2. The system of claim 1 wherein a second agent within said group can participate in said communication.

3. The system of claim 1 wherein said plurality of criteria are reconfigurable by any one of said plurality of agents.

4. The system of claim 1 wherein said selection means includes a voice processing means for deriving information about said caller.

5. The system of claim 1 wherein said matrix switch comprises any one of a tandem switch, a computer telephony interface, and an SS7 advanced intelligent network.

6. The system of claim 1 wherein said plurality of criteria is compared to a database of agent services offered by said plurality of agents.

7. A method for automatic distribution of a telephone communication from a caller, to a selected one of a plurality of agents, having respective wireless telephone terminals registered in a wireless telephone network, wherein the selected agent is not predetermined by the caller and is a member of at least one of a plurality of groups of agents, each member of each of said groups being capable of performing at least one of a plurality of agent services needed by the caller, said method comprising the steps of:

providing a matrix switch and a call control means, said call control means controlling said matrix switch and connecting said matrix switch to a first telephone line in response to a first telephone call from the caller via said first telephone line, and, in further response to the first call, for connecting said matrix switch to a second telephone line accessible by said plurality of agents across said wireless telephone network; and
   providing a caller criteria selection means connected to said call control means, said selection means gathering and analyzing a plurality of caller criteria and determining whether the first call is directed to one of the plurality of groups, and, if so, determining which of the plurality of agent services provided by the agents within said group is needed by the caller, and selecting at least one of said agents within said group as the agent to be connected to said caller in a manner based at least in part upon which of said agents within said group can provide said needed agent service at the time of said call from said caller, said call control means being connected to said selection means to access information identifying said selected agent, and to said matrix switch to connect said first telephone line to a communication path interconnecting said matrix switch and said wireless telephone network via said second telephone line, thereby establishing a telephone communication link between said caller and said selected agent's wireless telephone terminal via said wireless telephone network.

8. The method of claim 7 wherein a second agent within said group can participate in said communication.

9. The method of claim 7 wherein said plurality of criteria are reconfigurable by any one of said plurality of agents.

10. The method of claim 7 wherein said selection means includes a voice processing means for deriving information about said caller.

11. The method of claim 7 wherein said matrix switch comprises any one of a tandem switch, a computer telephony interface, and an SS7 advanced intelligent network.

12. The method of claim 7 wherein said plurality of criteria is compared to a database of agent services offered by said plurality of agents.

13. A system for automatic distribution of a telephone communication from a caller, to a selected one of a plurality of agents, having respective wireless telephone terminals registered in a wireless telephone network, wherein the selected agent is not predetermined by the caller and is a member of at least one of a plurality of groups of agents, each member of each of said groups being capable of performing at least one of a plurality of agent services needed by the caller, said system comprising:

a matrix switch;

a call control platform in electrical communication with said matrix switch, said call control platform connecting said switch and a first telephone line in response to a first telephone call from the caller via said first telephone line, and, in further response to the first call, connecting said matrix switch to a second telephone line accessible by said plurality of agents across said wireless telephone network;

an agent selection processor that gathers and analyzes a plurality of caller criteria and determines whether the first call is directed to one of the plurality of groups, and, if so, determines which of the plurality of agent services provided by the agents within said group is needed by the caller, and selects at least one of said agents within said group as the agent to be connected to said caller in a manner based at least in part upon which of said agents within said group can provide said needed agent service at the time of said call from said caller;

said call control platform being in electrical communication with said selection processor to access information identifying said selected agent, and to said matrix switch to connect said first telephone line to a communication path interconnecting said matrix switch and said wireless telephone network via said second telephone line, thereby establishing a telephone communication link between said caller and said selected agent's wireless telephone terminal via said wireless telephone network.

14. The system of claim 13 wherein a second agent within said group can participate in said communication.

15. The system of claim 13 wherein said plurality of criteria are reconfigurable by any one of said plurality of agents.

16. The system of claim 13 wherein said selection processor includes a voice processing means for deriving information about said caller.

17. The system of claim 13 wherein said matrix switch comprises any one of a tandem switch, a computer telephony interface, and an SS7 advanced intelligent network.

18. The system of claim 13 wherein said plurality of criteria is compared to a database of agent services offered by said plurality of agents.

* * * * *